Figure 1:
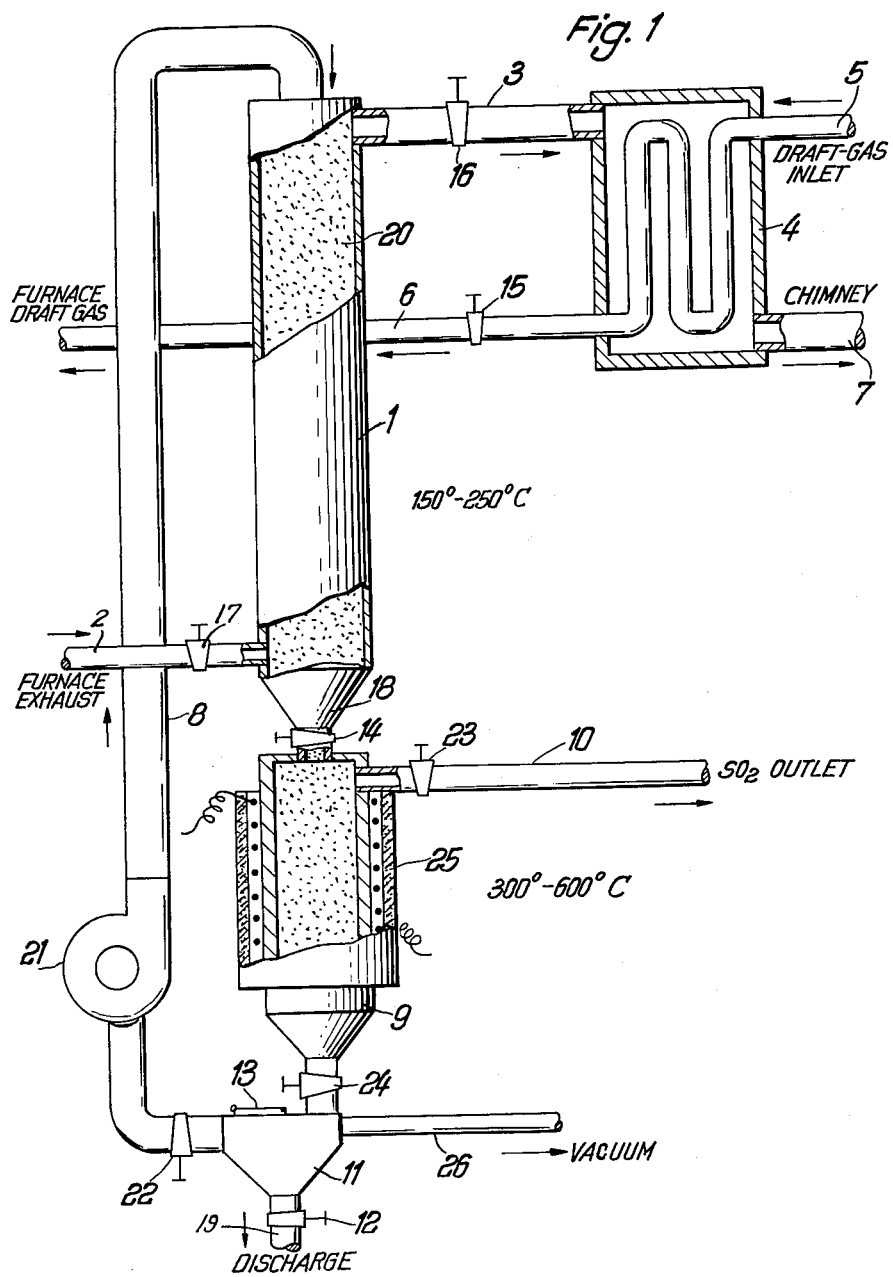

July 11, 1961   K. FEUSTEL ET AL   2,992,065
PROCESS FOR REMOVING SULFUR OXIDES FROM GASES
Filed June 24, 1959   2 Sheets-Sheet 1

Inventors:
KLAUS FEUSTEL
FRIEDRICH JOHSWICH
HEINZ STRATMANN
BY Karl F. Ross
AGENT

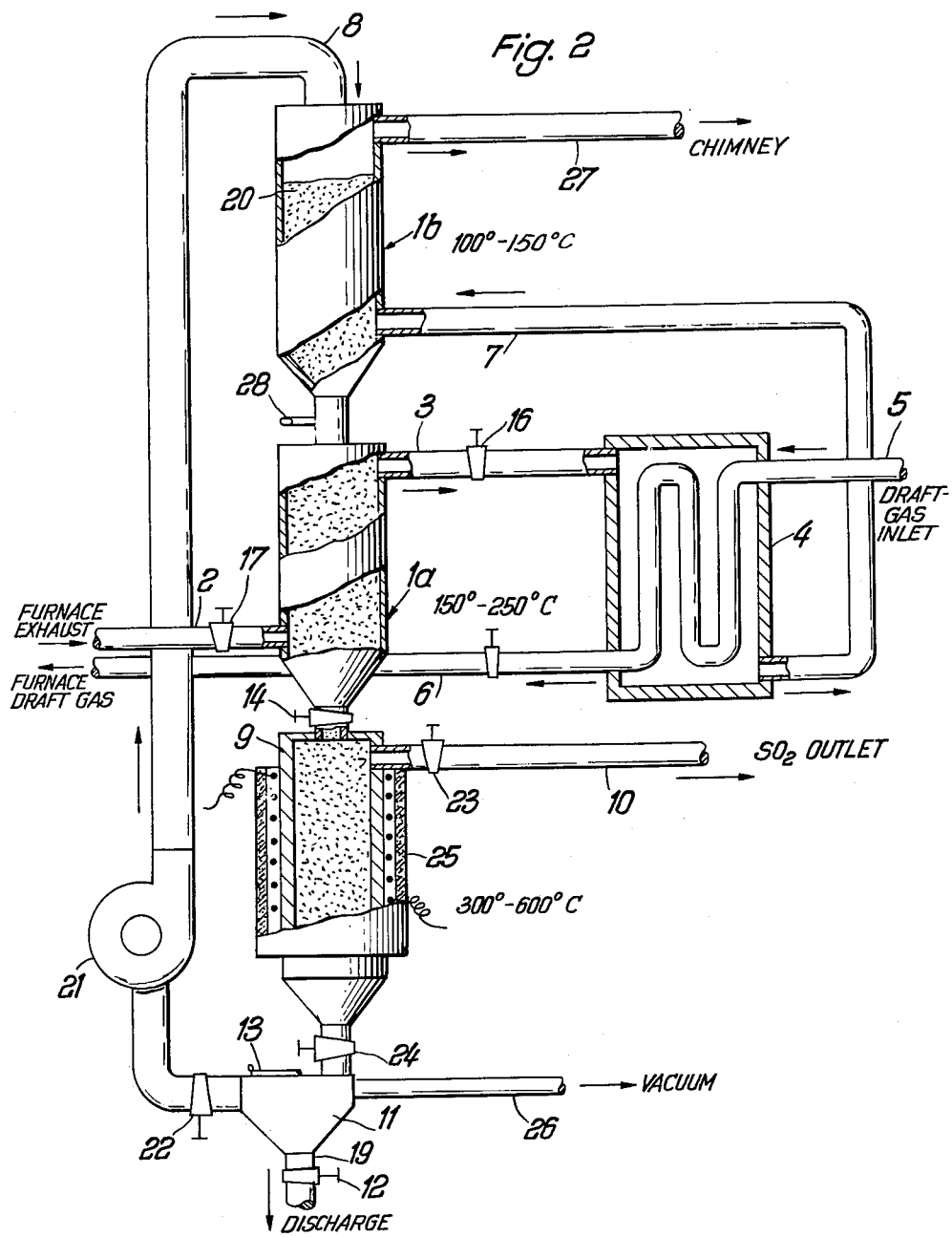

United States Patent Office 2,992,065
Patented July 11, 1961

2,992,065
PROCESS FOR REMOVING SULFUR OXIDES FROM GASES
Klaus Feustel, Friedrich Johswich, and Heinz Stratmann, all of Essen, Germany, assignors to Reinluft G.m.b.H., Essen-Ruhr, Germany, a limited-liability company of Germany
Filed June 24, 1959, Ser. No. 822,645
Claims priority, application Germany July 31, 1958
6 Claims. (Cl. 23—2)

Our present invention relates to the selective removal of acidic-oxide gases from furnace exhaust products. More particularly, our invention relates to the removal of corrosive oxides of sulfur from furnace exhaust gases which are to be used in the regenerative heating of furnace draft gas.

Whenever sulfur-bearing fuels, such as coal, fuel oil and the like, are burned in the presence of oxygen, sulfur dioxide, sulfur trioxide and the usual carbonaceous ash are produced along with other carbon-containing residue. The biologically deleterious effects of sulfur-oxide-laden flue gas has long been known, as has the corrosive activity of the oxides on pipes, boilers and the like with which they may come into contact. In addition, the presence of these acidic oxides seriously limits the usefulness of the furnace gases containing them for regenerative heating of furnace draft gas. Regenerative heating of a draft gas has long been known to increase the combustion efficiency of the furnaces in which they are used, particularly in those cases where the fuel (e.g. heavy-grade fuel oil) is pre-heated along with the draft gas.

The use of sulfur-bearing gas for regenerative-heating purposes is limited to situations where it is not required to reduce the temperature of the hot exhaust gas below approximately 180° C. in the heat-exchange process. At this temperature there has been observed a marked increase in the corrosiveness of the gas, due to the fact that, in the combustion process of sulfur-bearing fuels, water is formed in addition to the acidic oxides of sulfur. As is well known, the water vapor tends to liquefy when the ambient temperature (i.e. that of the surrounding gas) falls below the water-vapor dew point of that gas (40°–70° C.). This dew point is very seldom attained in the presence of hot furnace exhausts. In sulfur-bearing gases, however, a vapor-phase reaction occurs at approximately the boiling point of sulfuric acid (315°–350° C.) whereby the sulfur trioxide present reacts with the water vapor present to form sulfuric acid. The sulfuric acid thus formed has a dew point considerably higher than that of water vapor. For example, in a furnace exhaust gas containing about 50 milligrams of sulfur trioxide per cubic meter and having a water-vapor dew point of approximately 50° C., the sulfuric-acid dew point is 180° C. At this temperature, as is well known, sulfuric acid begins to condense, thereby markedly increasing the corrosiveness of the gas which contains it. Most furnace gases have acid dew points ranging between 150° and 250° C.

Several processes are known which attempt to reduce the corrosiveness of exhaust gas. Most of these processes require the preliminary treatment of the fuel with a neutralizing substance which will remove the acidic oxides in the combustion chamber; others require cooling the exhaust gas below the acid dew point, condensing the sulfuric acid and neutralizing it. In this category are those processes which intimately mix various salts of alkali and alkaline-earth metals with the fuel as, for example, by the addition of dolomite or limestone in pulverized form to the fuel oil. Oil-soluble calcium or magnesium compounds may be added similarly to petroleum. Another method is the addition of ammonia gas to the flue gas to neutralize the acid content thereof. These methods of neutralizing or removing sulfur compounds from the fuel or exhaust gas are expensive and of limited effectiveness.

A further method is the reduction of sulfur trioxide to sulfur dioxide by the use of activated charcoal or pulverized coal blown into the hot exhaust gas. This method has the disadvantage that the various hydrogen products present, including water, are preferentially reduced and that some of the coal is unavoidably burned by the excess oxygen content of the gas, thus necessitating a continuous supply of fresh carbonaceous substance.

An object of our present invention is, therefore, the provision of an improved process for the removal of sulfur trioxide from furnace exhaust gas at temperatures in excess of the acid dew point therein with the aid of inexpensive and abundantly available adsorbents. A more specific object of this invention is the provision of a process for the simultaneous removal of both sulfur trioxide and sulfur dioxide from furnace gases, thereby permitting them to be used in regenerative pre-heating apparatus for furnace draft gas or fuels and materially reducing the thermal capacity of the gases.

A feature of this invention is the use of carbonaceous adsorbing means for the removal of acidic oxides of sulfur concurrently with a mechanical purification of the flue gas in a filtering process similar to that disclosed in our co-pending applications Ser. No. 719,125, filed March 4, 1958, and Ser. No. 772,732, filed November 10, 1958, now Patent No. 2,977,325.

In our application Ser. No. 719,125 we disclose a process for the purification of industrial gases by the adsorption of very low concentrations of vaporous or gaseous oxides from such gases, including the step of catalytically oxidizing lower oxides to higher valence states on a carbonaceous material. Our application Ser. No. 772,732 deals primarily with the production of a carbonaceous adsorbent for that process.

Another feature of our invention resides in the sequential adsorption of sulfur dioxide and sulfur trioxide from such gases by the use of a single adsorbent passed in counter-current to the gases so as to remove first the sulfur dioxide and then the sulfur trioxide of the oncoming gas stream, preferably with continuous regeneration and recirculation of the adsorbent in a closed circuit.

For this purpose, we utilize a low-cost adsorbent such as wood charcoal, peat charcoal, low-temperature-burning coal such as lignite and the like which, after adsorbing sulfur trioxide at temperatures between 150° and 250° C., may be heated to temperatures between 300° and 600° C. to reduce the sulfur trioxide to sulfur dioxide which is then driven off by the heat; this process eliminates virtually all of the sulfur trioxide and permits the exhaust gas to be used to pre-heat a furnace draft gas or to be released into the atmosphere without deleterious biological effect.

It should be noted that the acid dew points of sulfur dioxide and sulfur trioxide differ and that, in cases where it is desired selectively to adsorb each of these gases, sulfur trioxide may be adsorbed in one section of the apparatus at temperatures above 150° C. and sulfur dioxide may be adsorbed in another section at temperatures below 150° C.

The above and other objects, features and advantages of our invention will be more readily apparent from the following detailed description of a process and an apparatus according to our invention for the removal of oxides of sulfur from hot furnace exhaust gas, reference being made to the accompanying drawing in which:

FIG. 1 is an elevational view, partly in section, of an apparatus embodying our invention; and FIG. 2 is a view similar to FIG. 1 of a modified embodiment of our invention.

We show in FIG. 1 an apparatus for the removal of $SO_3$ from hot furnace exhaust gas preparatorily to the use of such gas in a regenerative pre-heating system for furnace draft gas. The apparatus comprises an adsorbent tower 1 charged with a suitably comminuted, relatively cheap adsorbent 20 such as wood charcoal or the like, an adsorbent-regenerating tower 9 connected so as to effect the transfer of adsorbent 20 between tower 1 and tower 9 via adsorbent-transfer ducts 8 and 18 controlled by gates 22 and 14 respectively, heating means in the form of an electric heating element 25 jacketed around tower 9, an adsorbent-delivery means such as a pump 21 connected in duct 8, and a heat exchanger 4. Tower 9 opens into an adsorbent-cleaning chamber 11.

In operation a hot furnace exhaust gas containing $SO_3$ is conducted from a furnace combustion chamber, not shown, via a transmission pipe 2 into tower 1 charged with adsorbent 20. The hot gas flows through tower 1 at a temperature between 150° and 250° C., this being the optimum temperature for the adsorption of $SO_3$. The hot $SO_3$-free gas then passes through transmission pipe 3 into the shell of heat exchanger 4. It should be noted that the proper temperature in tower 1 may be maintained by suitably controlling the flow of the gas through the tower by valve 17, although cooling or heating means known per se may of course be used if desired. A furnace draft gas such as air is piped countercurrent to the flow of the hot $SO_3$-free exhaust gas through a conduit 5 and the heat exchanger 4 to the draft-gas inlet of the furnace via a pipe 6. For efficient heat transfer from the exhaust gas to the incoming draft gas, proper heat insulation of pipes 2, 3, 6 and towers 1, 4 and 9 is, of course, necessary. The cool, $SO_3$-free exhaust gas escapes from the heat exchanger 4 via a transmission pipe 7 to a chimney or flue. When the adsorbent 20 in tower 1 is sufficiently laden with $SO_3$, valve 14 is opened and the adsorbent is transferred to the regenerating tower 9. This transfer of adsorbent to the regenerating tower 9 may take place either at intervals or in a continuous manner. In regenerating tower 9, heating element 25 maintains a temperature between 300° and 600° C. to promote the reduction of $SO_3$ to $SO_2$ which is readily desorbed from the carbonaceous material and volatilized at these temperatures. The $SO_2$ thus liberated is conducted via pipe 10 to a collection or disposal apparatus which may include the usual liquefaction means. The regenerated adsorbent 20 is transferred from tower 9 into cleaning chamber 11 where fly ash and rubble are removed, preferably by low-pressure vacuuming, and then returned via duct 8 and pump 21 to the adsorbent tower 1. A hatch 13 in cleaning chamber 11 serves for the optional addition of fresh adsorbent prior to the recharging of the tower, while a discharge port 19 equipped with a valve 12 is provided for the removal of spent material.

In FIG. 2 we show an embodiment of our invention for the consecutive removal of both $SO_3$ and $SO_2$ from a furnace exhaust gas, comprising $SO_3$-removal means and $SO_2$-removal means in cascade. The apparatus is generally similar to that of the preceding embodiment, but its adsorption tower is divided into two sections including a lower trioxide section 1a and an upper dioxide section 1b.

In section 1a, at temperatures ranging preferably between 150° and 250° C., adsorption of $SO_3$ occurs as described with reference to FIG. 1; the hot $SO_3$-free exhaust gas is passed through the heat exchanger 4, being somewhat cooled thereby, and thereafter returned to section 1b by a pipe 7 where, at temperatures below 150° C., the $SO_2$ contained in the gas is adsorbed. When the adsorbent of section 1a has become laden with $SO_3$ it is transferred to the regenerating chamber 9 wherein it is freed of the entrained oxide in the manner described above. The $SO_2$-enriched adsorbent previously present in upper section 1b is simultaneously transferred, under the control of a damper 28, to lower section 1a where it is contacted with the furnace exhaust gas containing $SO_3$ which is adsorbed at the higher temperature present in section 1a. It is of course evident that by this two-fold utilization of the adsorbent a much greater adsorption efficiency is attained.

The sensible heat of the adsorbent in excess of that necessary in the adsorbent tower may be used after the desorption step, together with that of the hot $SO_2$ desorbed, in a heat exchanger similar to the one shown at 4 in order to pre-heat incoming draft gas or fuel. It may also be mentioned that the $SO_2$ accompanying the gas entering zone 1b may at least in part be further oxidized to $SO_3$ by the accompanying excess oxygen, owing to the catalytic surface action of the carbonaceous adsorbent, to improve its adsorbability as disclosed in our co-pending application Ser. No. 719,125; the high temperatures prevailing at the desorber 9 promote a return of the sulfur trioxide to its lower oxidation state, with the carbon serving as a reducing agent, as described above.

It will be apparent to persons skilled in the art that many modifications may be made in the process and the apparatus herein disclosed, such as the provision of different adsorbent-transfer means, the addition of various catalytic agents (e.g. metal salts) to the adsorbent to facilitate the reduction of $SO_3$ to $SO_2$, or the use of scrubbing gases or liquids as desorbing agents, without the exercise of independent invention and without departure from the spirit and scope of the appended claims.

We claim:

1. A process for removing sulfur trioxide from a hot gas stream, comprising the steps of contacting said gas stream with a carbonaceous adsorbent at a temperature between substantially 150° and 250° C. and thereafter regenerating said adsorbent at a temperature between substantially 300° and 600° C.

2. A process according to claim 1, comprising the further step of removing sulfur dioxide from said gas stream by contacting the latter with a carbonaceous adsorbent at a temperature ranging between substantially 100° and 150° C.

3. A process according to claim 1 wherein said adsorbent is a combustion residue having low chemical activity.

4. A process according to claim 1, comprising the further steps of recirculating said adsorbent into contact with said gas stream and separating entrained fly ash and rubble from the circulating adsorbent.

5. A process for removing sulfur trioxide from a hot gas stream, comprising the steps of contacting said gas stream with a carbonaceous adsorbent at a temperature between substantially 150° and 250° C. to adsorb sulfur trioxide therefrom, heating said adsorbent to a temperature sufficient to reduce the adsorbed sulfur trioxide to sulfur dioxide, and purging said adsorbent of sulfur dioxide.

6. A process for removing sulfur dioxide and sulfur trioxide from a hot gas stream, comprising the steps of contacting said gas stream with a carbonaceous adsorbent at a temperature between substantially 150° and 250° C. to adsorb sulfur trioxide therefrom, cooling said gas stream, contacting said gas stream with said adsorbent at a temperature between substantially 100° and 150° C. to adsorb sulfur dioxide therefrom, and heating said adsorbent to a temperature sufficient to reduce the adsorbed sulfur trioxide to sulfur dioxide and to purge said adsorbent of sulfur dioxide.

References Cited in the file of this patent

UNITED STATES PATENTS

| | | |
|---|---|---|
| 1,145,579 | Garner | July 6, 1915 |
| 1,825,707 | Wagner | Oct. 6, 1931 |
| 2,780,526 | Fleck | Feb. 5, 1957 |